United States Patent
Jain et al.

(10) Patent No.: US 12,481,812 B1
(45) Date of Patent: Nov. 25, 2025

(54) MULTI-MACHINE VERSION INDEPENDENT HIERARCHICAL VERIFICATION

(71) Applicant: Synopsys, Inc., Sunnyvale, CA (US)

(72) Inventors: Anchit Jain, Greater Noida (IN); Deepak Ahuja, New Delhi (IN); Paras Mal Jain, Cupertino, CA (US); Pronay Kumar Biswas, Sunnyvale, CA (US); Abhinav Singla, Greater Noida (IN)

(73) Assignee: Synopsys, Inc., Sunnyvale, CA (US)

( * ) Notice: Subject to any disclaimer, the term of this patent is extended or adjusted under 35 U.S.C. 154(b) by 617 days.

(21) Appl. No.: 17/881,526

(22) Filed: Aug. 4, 2022

(51) Int. Cl.
| | |
|---|---|
| *G06F 30/33* | (2020.01) |
| *G06F 30/20* | (2020.01) |
| *G06F 30/398* | (2020.01) |
| *G06F 115/02* | (2020.01) |
| *G06F 115/08* | (2020.01) |

(52) U.S. Cl.
CPC .............. *G06F 30/33* (2020.01); *G06F 30/20* (2020.01); *G06F 30/398* (2020.01); *G06F 2115/02* (2020.01); *G06F 2115/08* (2020.01)

(58) Field of Classification Search
CPC ......... G06F 30/33; G06F 30/20; G06F 30/398
USPC .............................. 716/136, 106, 111; 703/15
See application file for complete search history.

(56) References Cited

U.S. PATENT DOCUMENTS

| | | | | |
|---|---|---|---|---|
| 6,820,072 | B1 * | 11/2004 | Skaanning | G06F 11/3608 714/E11.218 |
| 7,086,029 | B1 * | 8/2006 | Barras | G06F 30/34 716/135 |
| 7,363,596 | B1 * | 4/2008 | Park | G06F 30/30 716/102 |
| 7,784,006 | B1 * | 8/2010 | Duthou | G06F 30/34 716/108 |
| 8,032,848 | B2 * | 10/2011 | Moon | G06F 30/3323 716/101 |

(Continued)

FOREIGN PATENT DOCUMENTS

| | | | | |
|---|---|---|---|---|
| CN | 102903714 | B * | 10/2015 | |
| CN | 113268947 | A * | 8/2021 | ............ G06F 16/211 |

(Continued)

OTHER PUBLICATIONS

Li et al., Chinese Patent Document No. CN-112699036-A, published Apr. 23, 2021, 3 pages including abstract, claims and 1 drawing. (Year: 2021).*

*Primary Examiner* — Phallaka Kik
(74) *Attorney, Agent, or Firm* — Weaver Austin Villeneuve & Sampson LLP

(57) ABSTRACT

A method of performing static verification of a circuit design that includes a number of circuit blocks, includes, in part, receiving a first model of a first block generated using a first version of a verification tool and having associated therewith data representative of a version number of each of a multitude of verification tests performed by the first version of the tool as well as associated first setup information. In response to the determination that, for each of the of tests performed, the version number of the test to be run on the circuit design is incompatible with the version number of the test performed by the first version of the tool, portions of the first model that were tested with the version number(s) of the test(s) determined to be incompatible with the version number(s) of the test(s) to be run on the circuit design are regenerated.

20 Claims, 9 Drawing Sheets

(56) References Cited

U.S. PATENT DOCUMENTS

| | | | | |
|---|---|---|---|---|
| 8,245,163 B1* | 8/2012 | Yuan | ............... | G06F 30/34 |
| | | | | 716/104 |
| 9,092,586 B1* | 7/2015 | Ginetti | ............... | G06F 30/30 |
| 10,783,312 B1* | 9/2020 | Ginetti | ............... | G06F 30/398 |
| 11,093,672 B2* | 8/2021 | Khan | ............... | G06F 30/327 |
| 11,669,687 B1* | 6/2023 | Joshi | ............... | G06F 40/30 |
| | | | | 704/9 |
| 12,314,645 B2* | 5/2025 | Gaulter | ............... | G06F 7/24 |
| 2002/0162077 A1* | 10/2002 | Jeng | ............... | G06F 30/30 |
| | | | | 716/102 |
| 2010/0162194 A1* | 6/2010 | Qian | ............... | G06F 30/394 |
| | | | | 716/139 |
| 2012/0123990 A1* | 5/2012 | Eckardt | ............... | G06F 8/10 |
| | | | | 706/47 |
| 2013/0055174 A1* | 2/2013 | Boehm | ............... | G06F 30/33 |
| | | | | 716/108 |
| 2013/0060545 A1* | 3/2013 | Chockler | ............... | G06F 30/3323 |
| | | | | 703/6 |
| 2014/0122026 A1* | 5/2014 | Aberg | ............... | G06F 30/20 |
| | | | | 703/1 |
| 2014/0278334 A1* | 9/2014 | Schaufler | ............... | G06F 11/3476 |
| | | | | 703/21 |
| 2014/0283031 A1* | 9/2014 | Eksten | ............... | G06F 21/51 |
| | | | | 726/22 |
| 2020/0401491 A1* | 12/2020 | Mohamed | ............... | G06F 11/2273 |
| 2021/0097431 A1* | 4/2021 | Olgiati | ............... | G06N 5/046 |
| 2021/0390420 A1* | 12/2021 | Barnett | ............... | G06N 5/02 |
| 2022/0318018 A1* | 10/2022 | Allen | ............... | G06F 21/6218 |
| 2024/0403493 A1* | 12/2024 | Parmar | ............... | G06F 21/16 |

FOREIGN PATENT DOCUMENTS

| | | | | |
|---|---|---|---|---|
| CN | 115168130 A | * | 10/2022 | ......... G06F 11/3676 |
| CN | 114444419 B | * | 12/2022 | |
| CN | 116341428 B | * | 7/2023 | |
| CN | 116719747 B | * | 11/2023 | |
| CN | 118210541 A | * | 6/2024 | |

* cited by examiner

MULTI-MACHINE VERSION INDEPENDENT HIERARCHICAL VERIFICATION

TECHNICAL FIELD

The present application relates to a static verification system, and more particularly to a system and method for providing multi-machine version independent hierarchical verification of integrated circuits.

BACKGROUND

A system-on-chip (SoC) typically includes a multitude of block-level designs—typically designed by different teams—that are subsequently connected together to make a functioning system. With the increase in size and complexity of the integrated circuit designs, static verification of multi-billion gate SoCs continues to pose challenges.

One technique for static verification of a relatively large SoC design is full-flat verification. In accordance with this technique, static verification of a fully functioning design is carried out in a single run after the design hierarchy is eliminated such that the entire design is represented in a single level with no hierarchy. However, a full-flat verification technique requires a relatively high runtime and storage space. Moreover, classification and/or re-analysis of analyzed violations during block level verification poses difficulties.

Another technique for static verification is abstract model hierarchical flow, such as Synopsys Abstract Model (SAM) flow developed by Synopsys® corporation. An abstract model of a block level design is a model which contains a reduced set of information necessary for the block to communicate and interact with other blocks of the design, including the highest level block of an SoC. In accordance with this technique, the block-level owner/designer generates an abstract model for the block. An abstract model may also be referred to as a representation model that includes relevant design information required for static verification, such as boundary level register transfer logic (RTL) The abstract models of various blocks are then connected to verify violations that may have been introduced due to communication among the blocks at the highest level of hierarchy. The abstract model hierarchical flow addresses the challenges associated with the full-flat flow run but introduces new difficulties, such as version compatibility. Version compatibility occurs when the abstract models for different blocks, or verification of the top-level SoC, are created by different versions of a verification tool.

SUMMARY

A method of performing static verification of a circuit design that includes a multitude of circuit blocks, in accordance with one embodiment of the present disclosure, includes, in part, receiving a first abstract model of a first one of the multitude of circuit blocks. The first abstract model is generated using a first version of a verification tool and having associated therewith data representative of a version number of each of a multitude of verification tests performed by the first version of the verification tool as well as a first setup information associated with the first circuit block.

The method further includes, in part, in response to a determination that, for each of the multitude of the tests performed by the first version of the verification tool, the version number of the test to be run on the circuit design is incompatible with the version number of the test performed by the first version of the tool, then regenerating portions of the first abstract model that were tested with the version number(s) of the test(s) determined to be incompatible with the version number(s) of the test(s) to be run on the circuit design so as to generate a modified first abstract model. The regeneration of the portions of the first abstract model is performed using the first setup information and the version number(s) of the test(s) to be run on the circuit design. The method further includes, linking the modified first abstract model to the circuit design, and performing verification of the circuit design using one of the linked first abstract model or the linked modified first abstract model.

In one embodiment, the method further includes, in part, receiving a second abstract model of a second one of the multitude of blocks. The second abstract model is generated using a second version of a verification tool and has associated therewith data representative of a version number of each of a multitude of verification tests performed by the second version of the verification tool as well as a second setup information associated with the second block.

The method further includes, in response to a determination that, for each of the multitude of the tests performed by the second version of the verification tool, the version number of the test to be run on the circuit design is incompatible with the version number of the test performed by the second version of the tool, regenerating portions of the second abstract model that were tested with the version number(s) of the test(s) determined to be incompatible with the version number(s) of the test(s) to be run on the circuit design so as to generate a modified second abstract model. The regeneration of the portions of the second abstract model is performed using the second setup information and the version number(s) of the test(s) to be run on the circuit design.

The method further includes, in part, linking the modified second abstract model to the circuit design; and performing verification of the circuit design using one of the linked second abstract model or the linked modified second abstract model.

In one embodiment, the circuit design includes the design of a system-on-chip. In one embodiment, the first block is a first intellectual property (IP) block designed by a first design team different from a second design team designing the second block. The second block is a second IP block. In one embodiment, the method further includes, in part, regenerating the portions of the first abstract model on a first computer; and regenerating the portions of the second abstract model on a second computer concurrently with the regeneration of the portions of the first abstract model.

In one embodiment, the method further includes, in part, storing the first setup information, and storing the second setup information. In one embodiment, the method further includes, storing the version number of each of the multitude of the tests performed by the first and second versions of the verification tool. In one embodiment, the method further includes, in part, linking the first abstract model to the circuit design in response to a determination that, for each of the plurality of the tests performed by the first version of the verification tool, the version number of the test to be run on the circuit design is compatible with the version number of the test performed by the first version of the verification tool.

A system, in accordance with one embodiment of the present disclosure, includes, in part, a memory storing instructions; and a processor, coupled with the memory and to execute the instructions. The instructions when executed cause the processor to receive a first abstract model of a first one of the multitude of circuit blocks. The first abstract model is generated using a first version of a verification tool and has associated therewith data representative of a version number of each of a multitude of verification tests performed by the first version of the verification tool as well as a first setup information associated with the first circuit block.

The instruction further cause the processor to, in response to a determination that, for each of the multitude of the tests performed by the first version of the verification tool, the version number of the test to be run on the circuit design is incompatible with the version number of the test performed by the first version of the tool, regenerate portions of the first abstract model that were tested with the version number(s) of the test(s) determined to be incompatible with the version number(s) of the test(s) to be run on the circuit design so as to generate a modified first abstract model. The regeneration of the portions of the first abstract model is performed using the first setup information and the version number(s) of the test(s) to be run on the circuit design. The instruction further cause the processor to link the modified first abstract model to the circuit design, and perform verification of the circuit design using one of the linked first abstract model or the linked modified first abstract model.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Static verification is a key part of the development cycle and integration of an SoC. Embodiments of the present disclosure eliminate the problems associated with tool version compatibility by regenerating the incompatible portions/segments of abstract models of various blocks disposed in an SoC with a tool version with which the top-level SoC is to be verified.

Embodiments of the present disclosure achieve a number of advantages. Among such advantages are (i) parallel regeneration of version incompatible abstract models thereby to achieve, for example, 5-10 times performance gain, and fewer iterations relative to existing techniques; (ii) push-button hierarchical flow for the top-level SoC verification that is transparent to the users; and (iii) support for reuse of the re-generated abstract models for subsequent runs, thereby reducing the turnaround time.

Figure 1:
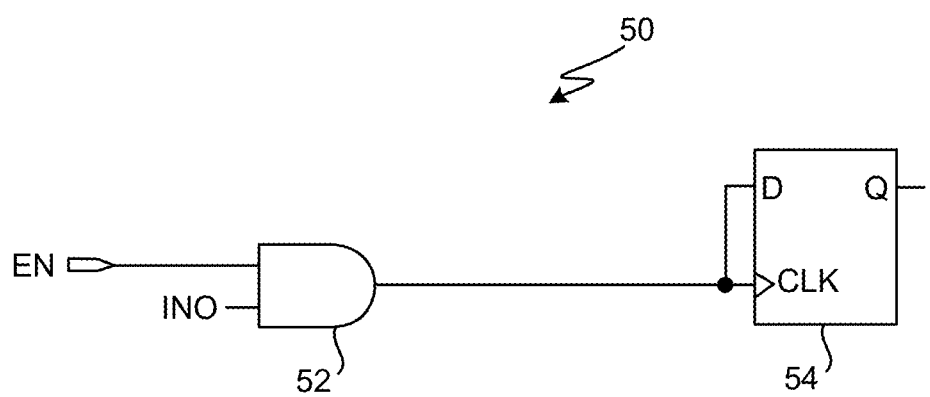
FIG. 1 is an example of a logic circuit that may be flagged by a verification tool for failing to pass an integrity test.

FIG. 1 shows a logic circuit 50 that may be flagged by a static verification tool for failing to pass an integrity test. Because the clock terminal CLK of flip-flop 54 is driven directly by AND gate 52 that receives the enabling signal EN, circuit 50 may fail the integrity test performed by a static verification tool. To pass the integrity test, the tool may require that signal EN be latched according to some predefined rule before being applied to flip-flop 54 via AND gate 52.

Figure 2:
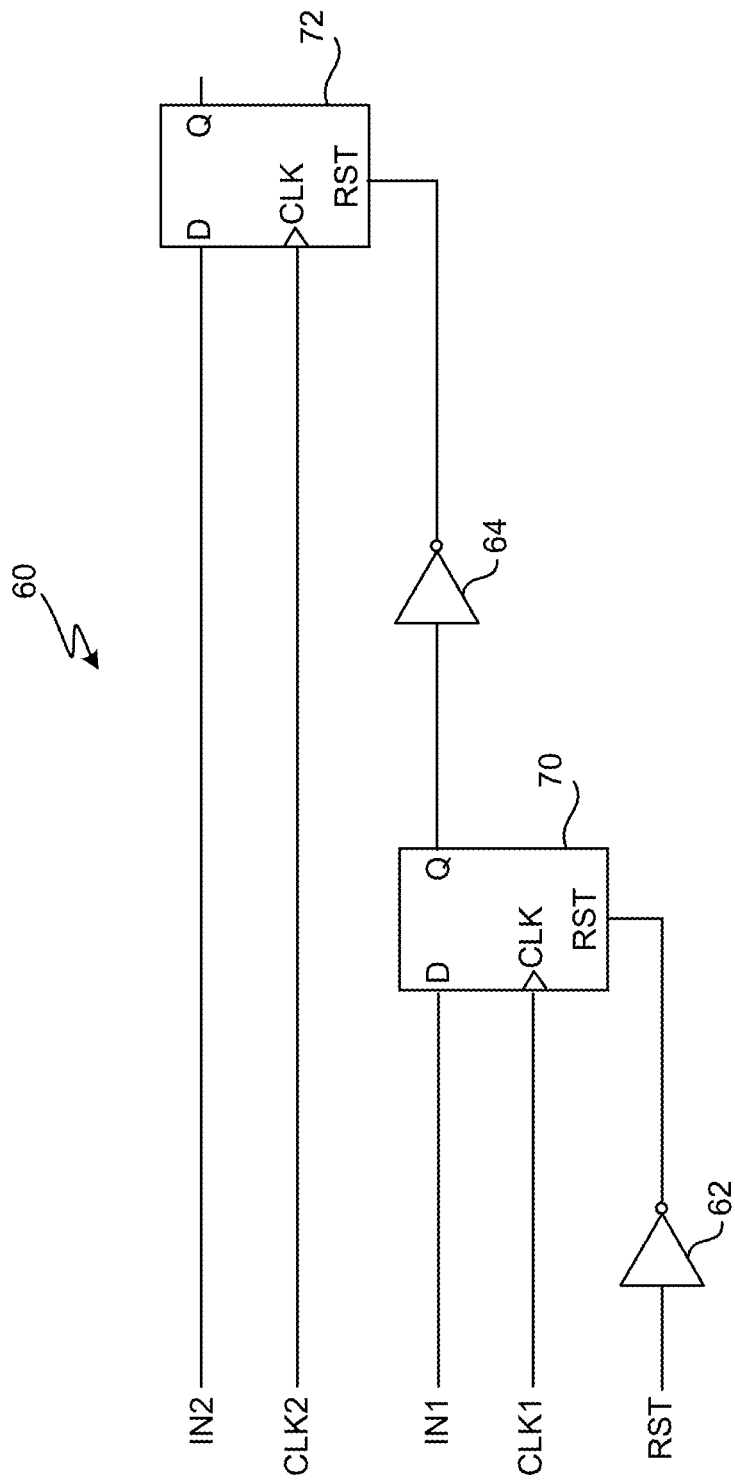
FIG. 2 is an example of a logic circuit that may be flagged by a verification tool for failing to pass a reset crossing test.

FIG. 2 shows a logic circuit 60 that may be flagged by a verification tool for failing to pass a reset crossing test. Because output Q of flip-flop 70 is applied to the reset terminal RST of flip-flop 72 (via inverter 64), and flip-flops 70 and 72 are not synchronized, circuit 60 may fail the reset crossing test performed by a verification tool. It is understood that a static verification tool often performs a multitude of other tests that are not described herein.

Figure 3:
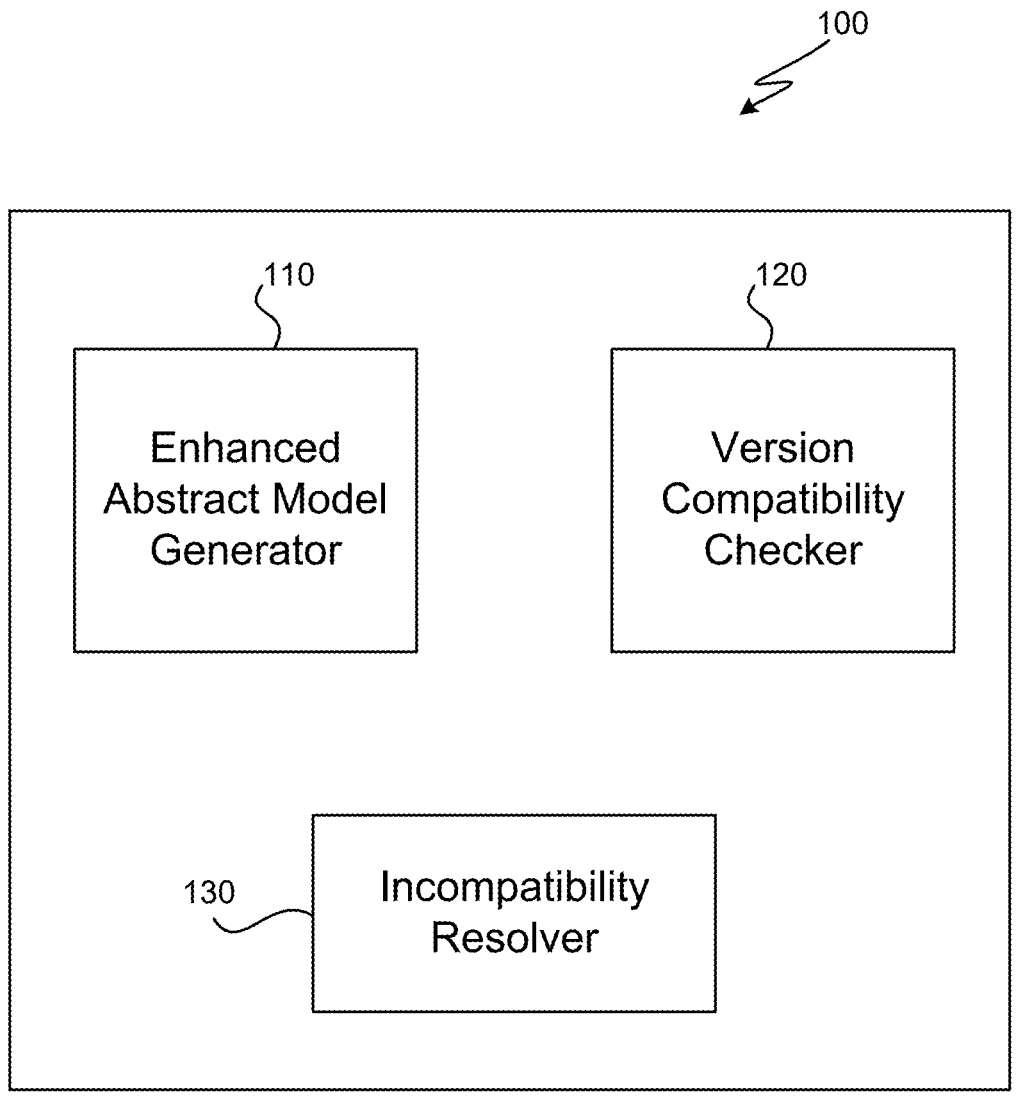
FIG. 3 shows a number of components of a static verification tool, in accordance with one embodiment of the present disclosure.

FIG. 3 shows a number of components of a static verification tool 100, in accordance with one embodiment of the present disclosure. Static verification tool 100 is shown as including, in part, an abstract model generator 110, a version compatibility checker 120, and an incompatibility resolver 130. Abstract model generator 110, version compatibility checker 120, and incompatibility resolver 130 are software components represented by instruction codes stored in a non-transitory computer-readable storage medium and executed by a processor, as described further below with respect to FIG. 9. Although only three components of a static verification tool 100 are shown in FIG. 3, it is understood, that a static verification tool, in accordance with embodiments of the present disclosure, includes many other components that are not shown in FIG. 3. It is further appreciated that the components 110, 120, and 130 may be combined or separated in different combinations without deviating from the scope of the present disclosure.

Abstract model generator 110 captures data representative of a version number (alternatively referred to herein as version number) of the tool used to generate an abstract model of a block, as well as the setup information used to generate an abstract model of a block. The setup information of a block includes, in part, a corresponding RTL design, libraries, databases, constraints, and configurations used to verify the block. The reduced set of information that is necessary for the block to communicate and interact with other blocks of the design, and from which the abstract model of the block is generated, is also derived from the setup information. The version number is captured for each static verification test. For example, the version number of the integrity test, described above with reference to FIG. 1, may be different from the version number of the reset crossing test, described above with reference to FIG. 2, for the same version of a static verification tool. Abstract model generator 110 is adapted to store the version number associated with each test that the abstract model generator 110 performs in generating an abstract model for a block, as well as the setup information associated with each test that the abstract model generator 110 performs on the block.

As described further below, if during the verification of a top-level SoC design, for each of the multitude of tests (alternatively referred to herein as checks) that the tool performs (e.g. reset crossing test), an incompatibility is detected between the version number of the test to be used to verify the top-level SoC design and the version number of the test used earlier to verify a block of the SoC, then the previously stored setup information associated with the block is used to regenerate any portion of the abstract model of the block that was tested with the incompatible version of the test. Such portions of the abstract model of block are regenerated using the same version of the tests that is to be used to verify the top-level SoC design. In one embodiment, the setup information of a block may be stored in an encrypted form.

Version compatibility checker 120 extracts, associated with each test that the verification tool is adapted to perform, the version number to be used to verify the top-level SoC design, and the version number used earlier to test and generate the abstract model of each block disposed in the SoC to determine if the versions are compatible. If an incompatibility is detected between the versions associated with any such tests, the version number of the test used to verify the block, together with the modules or sub-blocks disposed in the block that were tested with the incompatible version are forwarded to incompatibility resolver component 130, described further below. If no incompatibility is detected, then the abstract model of the block is linked to the top-level Soc design for verification. Accordingly, version compatibility checker 120 identifies portions of an abstract model that were verified with test versions that are incompatible with the test version to be used to verify the top-level SoC design verification.

Incompatibility resolver 130 uses the version numbers provided thereto by the version compatibility checker to regenerate, using the setup information described above, any portion of the abstract model for each block that was tested with a test version that is determined to be incompatible with a test version to be used in verification of the top-level SoC design. To achieve this, incompatibility resolver 130 creates an abstract model regeneration job for the incompatible portions of each abstract model. To ensure a minimal performance overhead, in some embodiments, each job is run on a different machine in parallel, thus enabling a distributed and parallel incompatibility resolution and abstract model regeneration of the incompatible portions of the various blocks of the SoC concurrently. In other words, incompatibility resolver 130 creates and runs such jobs in a distributed environment for parallel regeneration of the incompatible portions of each block. After the incompatibility of all the blocks are resolved and abstract models of the incompatible portions of the various blocks are regenerated, the newly regenerated abstract models are linked to the top-level SoC design for verification.

Figure 4:
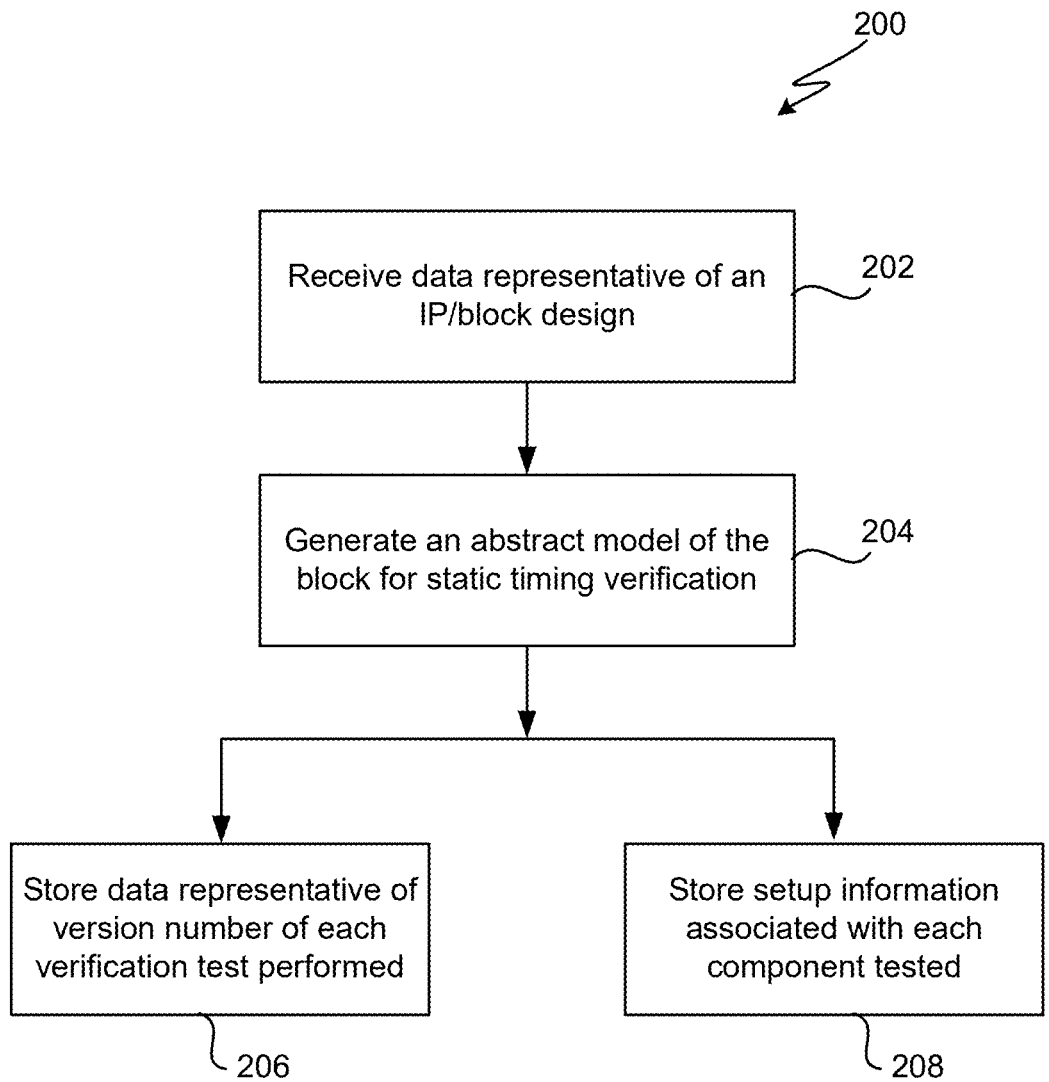
FIG. 4 shows a flowchart of various processes performed by an abstract model generator component of a static verification tool, in accordance with one embodiment of the present disclosure.

FIG. 4 shows a flowchart 200 of a number of processes performed by an abstract model generator, such as abstract model generator 110 shown in FIG. 3, in accordance with one embodiment of the present disclosure. At 202, data representative of an IP or a block of design (collectively and alternatively referred to herein as IP or block) are received by the abstract model generator. At 204, an abstract model of the block is generated by the abstract model generator. At 206, data representative of the version number of each test performed by the abstract model generator is stored. At 208, the setup information associated with each component or sub-block of the block tested by the abstract model generator is stored.

Figure 5:
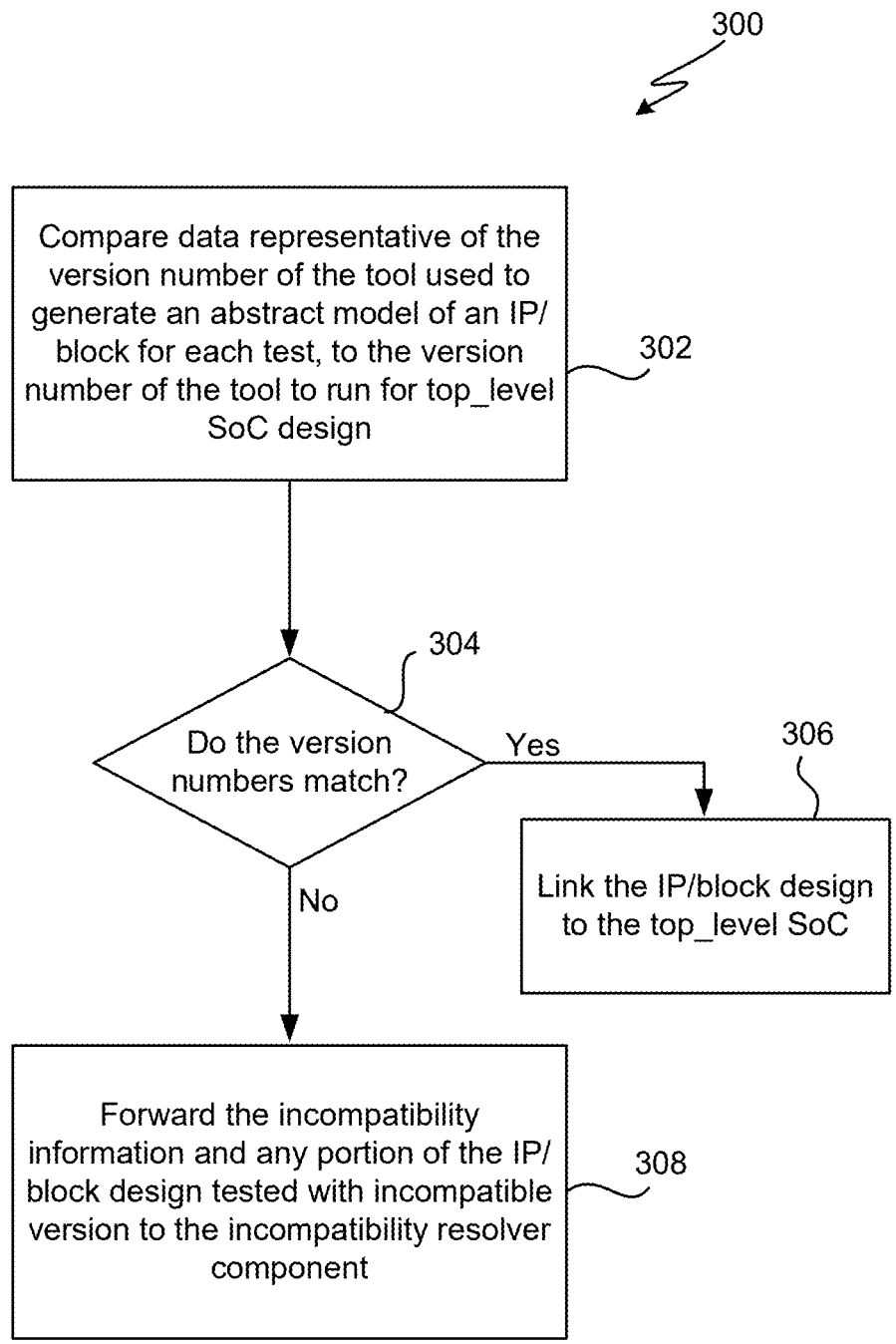
FIG. 5 shows a flowchart of various processes performed by a version compatibility checker component of a static verification tool, in accordance with one embodiment of the present disclosure.

FIG. 5 shows a flowchart 300 of a number of processes performed by a version compatibility checker, such as version compatibility checker 120 shown in FIG. 3, in accordance with one embodiment of the present disclosure. At 302, data representative of the version number of the tool associated with each test used to test and generate an abstract model of each block disposed in the SoC is compared to the version number of the tool to be used for the verification of the top-level SoC design. If at 304, the version numbers are determined as matching for the tests, then the abstract model of the block is linked to the top-level SoC design. If at 304, the versions numbers are determined as being incompatible and thus not matching for the tests, then at 308, the incompatibility information and any portion of the block tested with the incompatible version is forwarded to the incompatibility resolver component.

Figure 6:
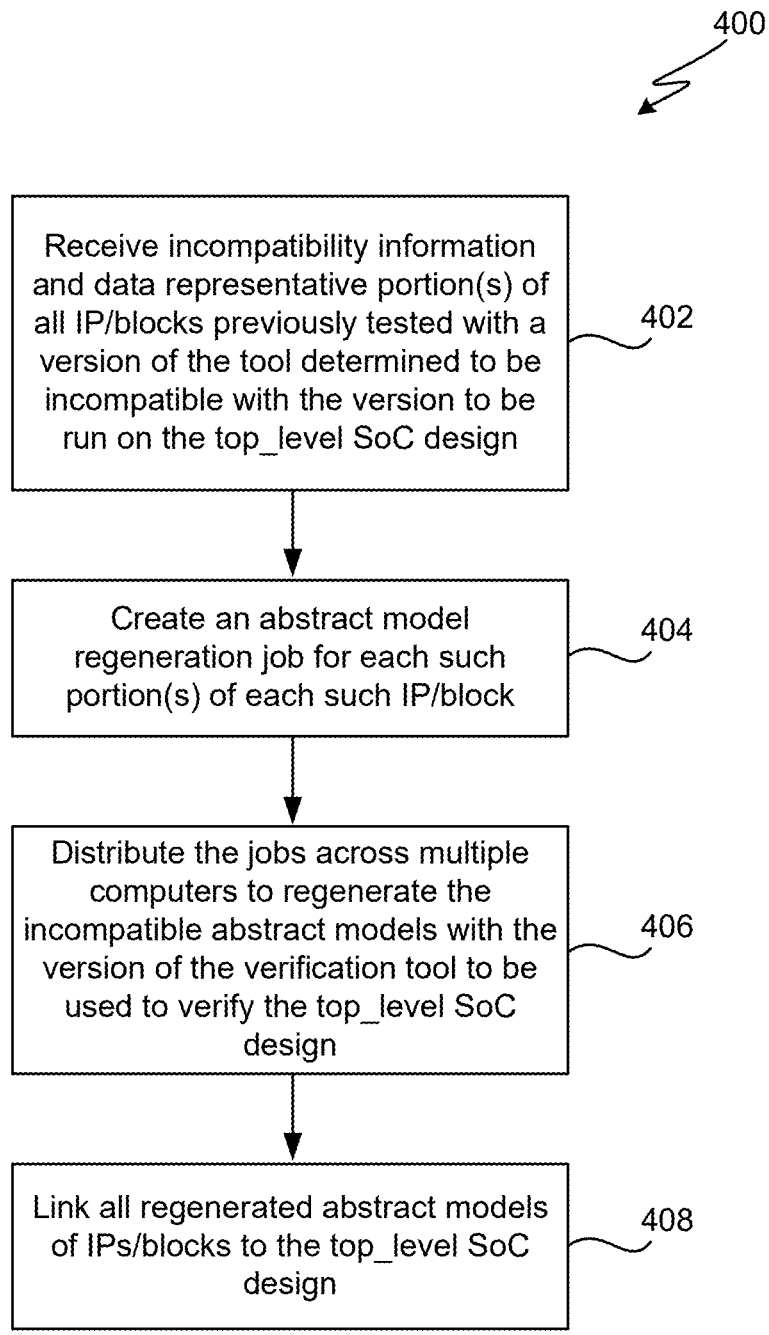
FIG. 6 shows a flowchart of various processes performed by an incompatibility resolver component of a static verification tool, in accordance with one embodiment of the present disclosure.

FIG. 6 shows a flowchart 400 of a number of processes performed by an incompatibility resolver, such as incompatibility resolver 130 shown in FIG. 3, in accordance with one embodiment of the present disclosure. At 402, the version incompatibility information and data representative of portions of each block that was previously tested with a version of the tool determined to be incompatible with the version of the tool to be run on the top-level SoC design is received. At 404, an abstract model regeneration job is created for the portion(s) of each block that was previously tested with a version of the tool determined to be incompatible with the tool version to be run on the top-level SoC design. Regeneration is performed using the same setup information that is captured (in an encrypted format) during the generation of the abstract model. But regeneration is performed only for the partial block(s) instead of the complete block depending upon what is changed. For example, if the tool version for the top-level is changed to handle the reset-path analysis in a different way, then only the portion of the block which is impacted by reset-path analysis is regenerated. At 406, the model abstract regenerations jobs are distributed across a multitude of computers so as to regenerate the incompatible portions(s) of the block(s) with the version of the tool to be used for verification of the top-level SoC design. Each regeneration job is independent of the other jobs, and all jobs are submitted to different machines using a protocol specified by the user using a series commands. The tool waits for all the jobs to complete. Once all the jobs are completed, the newly regenerated abstract models (instead of original abstract models) are then linked to the top-level SOC for verification. At 408, the newly regenerated abstract models of the blocks are linked to the top-level SoC design to enable static verification of the top-level SoC design.

Figure 7:
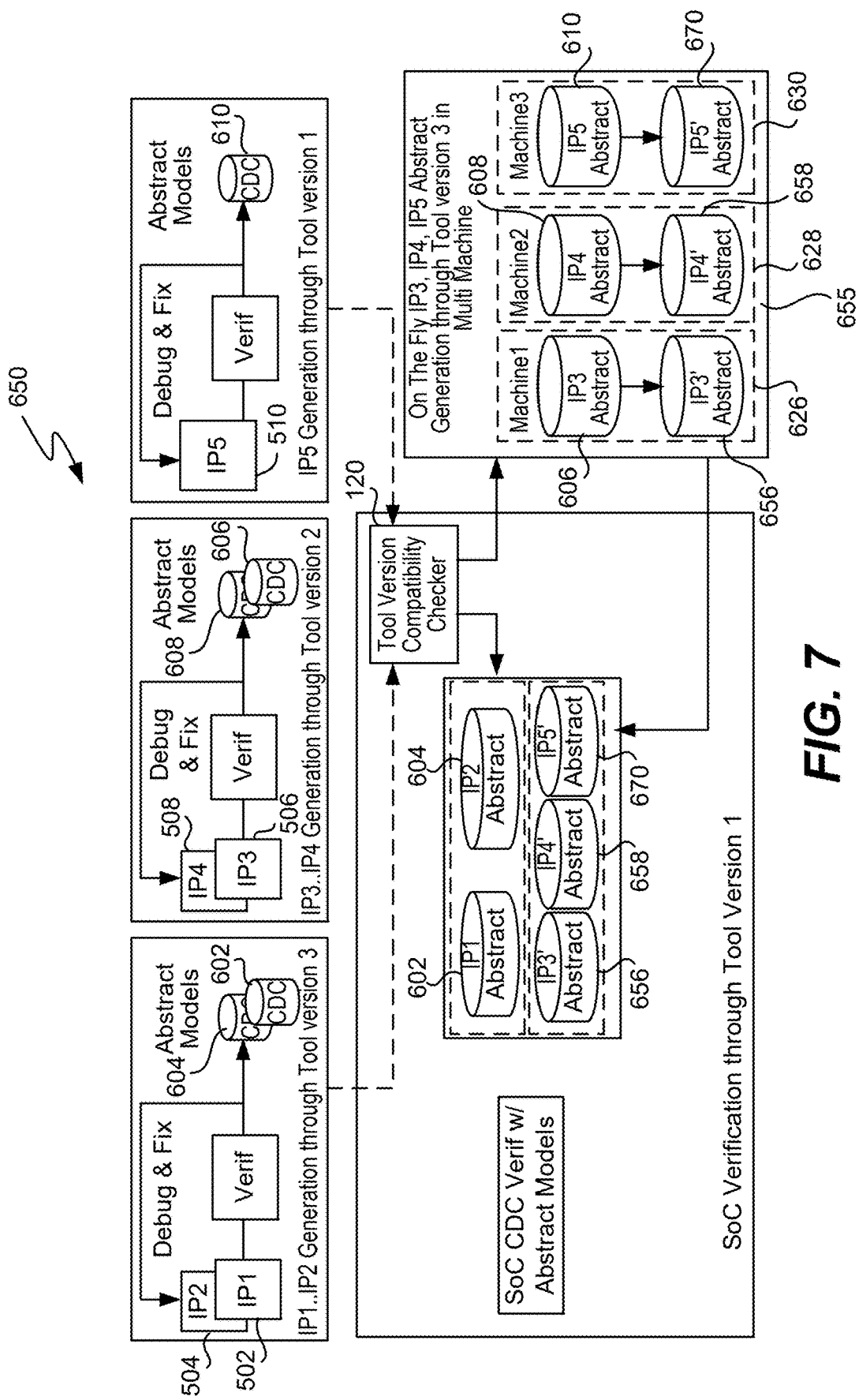
FIG. 7 shows an example of an SoC with a multitude of IP blocks a number of which have been verified with a version of a verification tool determined to be incompatible with the version of the tool to be run on the SoC, in accordance with one embodiment of the present disclosure.

FIG. 7 is a flow diagram for static verification of an SoC design 650 shown as including five IPs/blocks, namely IP1 502, IP2 504, IP3 506, IP4 508, and IP5 510. IP1 502 and IP2 504 are shown as having been verified with version 3 of a static cation tool which is the same version of the tool with which SOC design 650 will be tested. The verification tool is shown as having generated abstract models 602 and 604 respectively for IP1 502 and IP2 504. IP3 506 and IP4 508 are shown as having been verified with version 2 of the static verification tool. The tool is shown as having generated abstract models 606 and 608 respectively for IP3 506 and IP4 508. IP5 510 is shown as having been verified with version 1 of the static verification tool. The tool is also shown as having generated abstract models 610 for IP5 510. Static verification of SoC design 650 will be performed with version 3 of the static verification tool.

Version compatibility checker 120 is shown as having determined that abstract models 602 and 604 are generated using the same version 3 of the tool that the SoC will be tested with. Accordingly, abstract models 602 and 604 are directly linked to the SoC 650 for verification.

Version compatibility checker 120 is also shown as having determined that abstract models 606, 608 and 610 are generated using versions 1 and 2 of the verification tool that are different from version 3 of the tool with which SoC 650 will be tested. Accordingly, the incompatibility resolver (not shown in FIG. 7) creates three different jobs 626, 628 and 630 to enable the regeneration of abstract models (or portions thereof as described in detail above) 606, 608 and 610 respectively using version 3 of the tool. As seen from the example shown in FIG. 7, regeneration of abstract model 606 is carried out by a first computing system performing job 626, regeneration of abstract model 608 is carried out by a second computing system performing job 628, and regeneration of abstract model 610 is carried out by a third computing system performing job 630. Jobs 626, 628 and 630 are concurrent jobs and are run in parallel. After completion of the jobs, regenerated abstract model 656 of IP3 506, regenerated abstract model 658 of IP4 508, and regenerated abstract model 670 of IP5 510 are linked to SoC 650 so as to enable the verification of the SoC 650 with version 3 of the tool.

Figure 8:
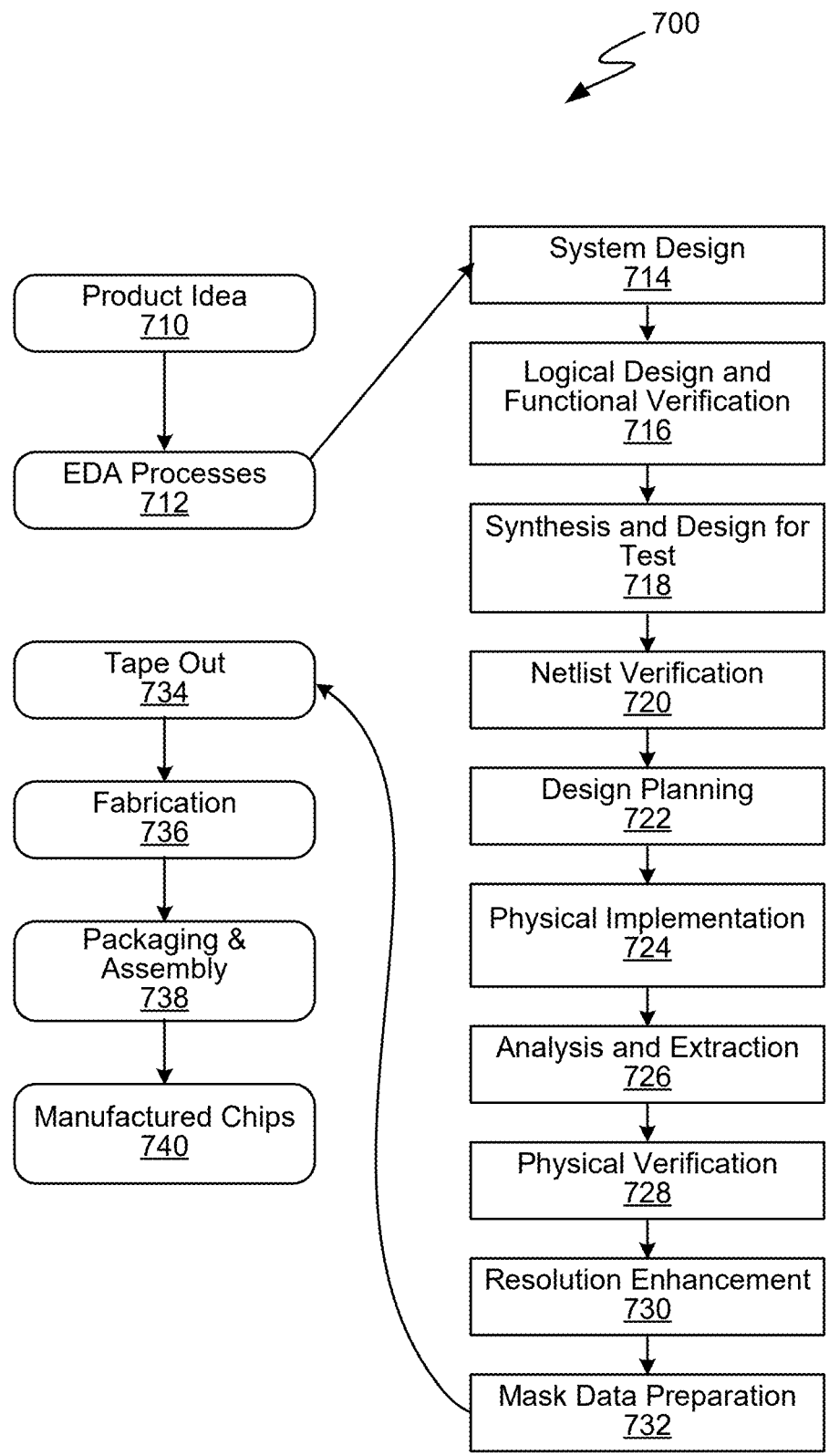
FIG. 8 depicts a flowchart of various processes used during the design and manufacture of an integrated circuit in accordance with some embodiments of the present disclosure.

FIG. 8 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 8. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with constraints and for correspondence with the HDL code. During design planning 722, an overall floor plan for the integrated circuit is constructed and analyzed for top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
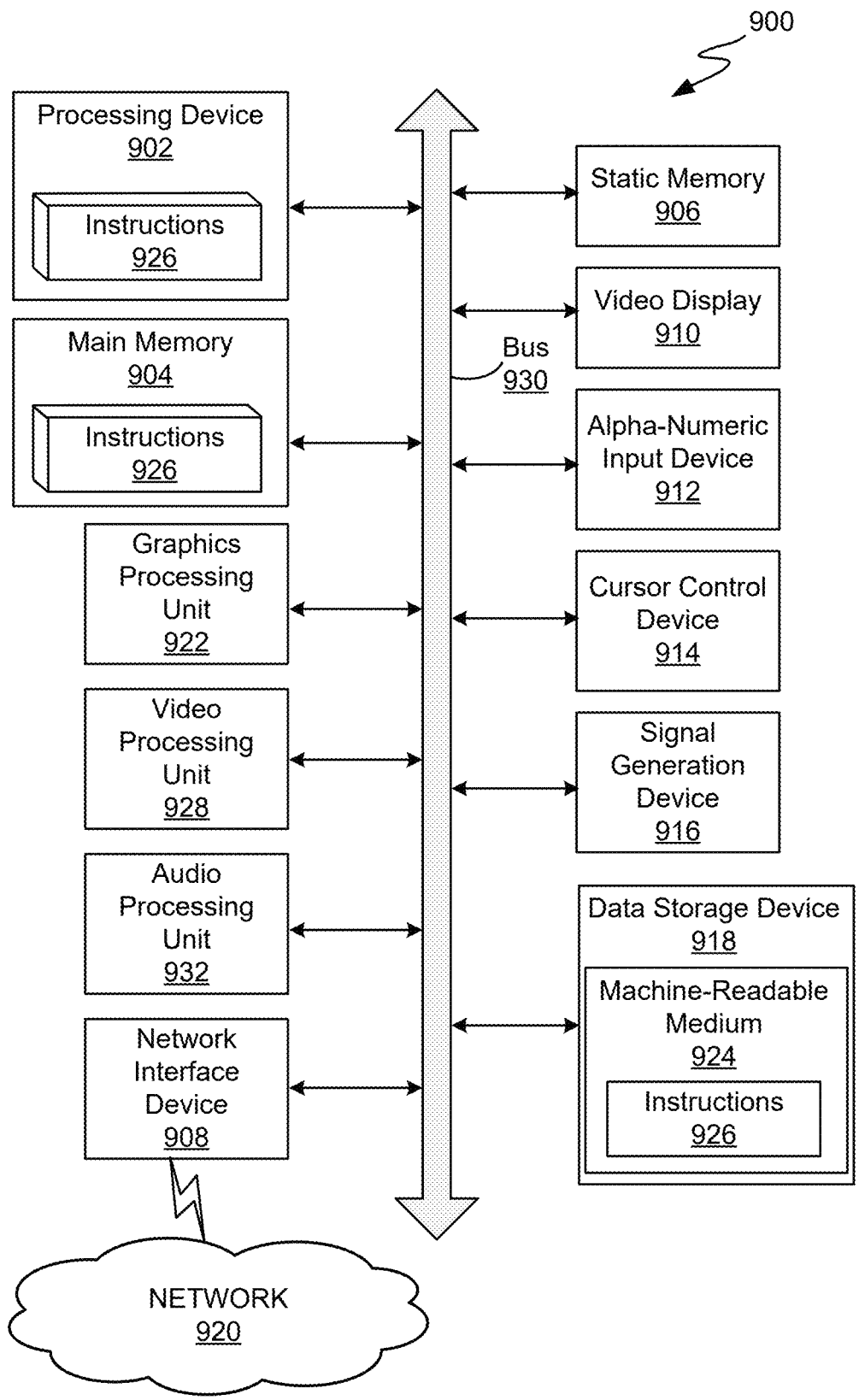
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A method of performing static verification of a circuit design that comprises a plurality of circuit blocks, the method comprising:
   receiving a first model of a first one of the plurality of circuit blocks, the first model generated using a first version of a verification tool and having associated therewith data representative of a version number of each of a plurality of verification tests performed by the first version of the verification tool as well as a first setup information associated with the first circuit block;
   in response to a determination that, for each of the plurality of the tests performed by the first version of the verification tool, the version number of the test to be run on the circuit design is incompatible with the version number of the test performed by the first version of the tool, regenerating portions of the first model that were tested with the version number(s) of the test(s) determined to be incompatible with the version number(s) of the test(s) to be run on the circuit design so as to generate a modified first model, wherein the regeneration of the portions of the first model is performed using the first setup information and the version number(s) of the test(s) to be run on the circuit design;
   linking the modified first model to the circuit design; and
   performing verification of the circuit design using one of the received first model or the linked modified first model.

2. The method of claim 1, further comprising:
   receiving a second model of a second one of the plurality of blocks, the second model generated using a second version of a verification tool and having associated therewith data representative of a version number of each of a plurality of verification tests performed by the second version of the verification tool as well as a second setup information associated with the second block;
   in response to a determination that, for each of the plurality of the tests performed by the second version of the verification tool, the version number of the test to be run on the circuit design is incompatible with the version number of the test performed by the second version of the tool, regenerating portions of the second model that were tested with the version number(s) of the test(s) determined to be incompatible with the version number(s) of the test(s) to be run on the circuit design so as to generate a modified second model, wherein the regeneration of the portions of the second model is performed using the second setup information and the version number(s) of the test(s) to be run on the circuit design;
   linking the modified second model to the circuit design; and
   performing verification of the circuit design using one of the received second model or the linked modified second model.

3. The method of claim 2, wherein the circuit design comprises a system-on-chip.

4. The method of claim 2, wherein the first block is a first intellectual property (IP) block designed by a first design team different from a second design team designing the second block, wherein the second block is a second IP block.

5. The method of claim 2, further comprising:
   regenerating the portions of the first model on a first computer; and
   regenerating the portions of the second model on a second computer concurrently with the regeneration of the portions of the first model.

6. The method of claim 2, further comprising:
   storing the first setup information; and
   storing the second setup information.

7. The method of claim 2, further comprising:
   storing the version number of each of the plurality of tests performed by the first and second versions of the verification tool.

8. The method of claim 1, further comprising:
   linking the first model to the circuit design in response to a determination that, for each of the plurality of the tests performed by the first version of the verification tool, the version number of the test to be run on the circuit design is compatible with the version number of the test performed by the first version of the verification tool.

9. A system comprising:
   a memory storing instructions; and
   a processor, coupled with the memory and to execute the instructions, the instructions when executed cause the processor to:
   receive a first model of a first one of the plurality of circuit blocks, the first model generated using a first version of a verification tool and having associated therewith data representative of a version number of each of a plurality of verification tests performed by the first version of the verification tool as well as a first setup information associated with the first circuit block;
   in response to a determination that, for each of the plurality of the tests performed by the first version of the verification tool, the version number of the test to be run on the circuit design is incompatible with the version number of the test performed by the first version of the tool, regenerate portions of the first model that were tested with the version number(s) of the test(s) determined to be incompatible with the version number(s) of the test(s) to be run on the circuit design so as to generate a modified first model, wherein the regeneration of the portions of the first model is performed using the first setup information and the version number(s) of the test(s) to be run on the circuit design;

link the modified first model to the circuit design; and perform verification of the circuit design using one of the received first model or the linked modified first model.

10. The system of claim 9, wherein the instructions further cause the processor to:

receive a second model of a second one of the plurality of blocks, the second model generated using a second version of a verification tool and having associated therewith data representative of a version number of each of a plurality of verification tests performed by the second version of the verification tool as well as a second setup information associated with the second block;

in response to a determination that, for each of the plurality of the tests performed by the second version of the verification tool, the version number of the test to be run on the circuit design is incompatible with the version number of the test performed by the second version of the tool, regenerate portions of the second model that were tested with the version number(s) of the test(s) determined to be incompatible with the version number(s) of the test(s) to be run on the circuit design so as to generate a modified second model, wherein the regeneration of the portions of the second model is performed using the second setup information and the version number(s) of the test(s) to be run on the circuit design;

link the modified second model to the circuit design; and perform verification of the circuit design using one of the received second model or the linked modified second model.

11. The system of claim 10, wherein the instructions further cause the processor to:

regenerate the portions of the first model on a first computer; and regenerate the portions of the second model on a second computer concurrently with the regeneration of the portions of the first model.

12. The system of claim 10, wherein the instructions further cause the processor to:

store the first setup information; and storing the second setup information.

13. The system of claim 10, wherein the instructions further cause the processor to:

store the version number of each of the plurality of tests performed by the first and second versions of the verification tool.

14. The system of claim 10, wherein the instructions further cause the processor to:

link the first model to the circuit design in response to a determination that, for each of the plurality of the tests performed by the first version of the verification tool, the version number of the test to be run on the circuit design is compatible with the version number of the test performed by the first version of the verification tool.

15. A non-transitory computer readable medium comprising stored instructions, which when executed by a processor, cause the processor to:

receive a first model of a first one of the plurality of blocks, the first model generated using a first version of a verification tool and having associated therewith data representative of a version number of each of a plurality of verification tests performed by the first version of the verification tool as well as a first setup information associated with the first block;

in response to a determination that, for each of the plurality of the tests performed by the first version of the verification tool, the version number of the test to be run on the circuit design is incompatible with the version number of the test performed by the first version of the tool, regenerate portions of the first model that were tested with the version number(s) of the test(s) determined to be incompatible with the version number(s) of the test(s) to be run on the circuit design so as to generate a modified first model, wherein the regeneration of the portions of the first model is performed using the first setup information and the version number(s) of the test(s) to be run on the circuit design;

link the modified first model to the circuit design; and perform verification of the circuit design using one of the received first model or the linked modified first model.

16. The non-transitory computer readable medium of claim 15, wherein the instructions further cause the processor to:

receive a second model of a second one of the plurality of blocks, the second model generated using a second version of a verification tool and having associated therewith data representative of a version number of each of a plurality of verification tests performed by the second version of the verification tool as well as a second setup information associated with the second block;

in response to a determination that, for each of the plurality of the tests performed by the second version of the verification tool, the version number of the test to be run on the circuit design is incompatible with the version number of the test performed by the second version of the tool, regenerate portions of the second model that were tested with the version number(s) of the test(s) determined to be incompatible with the version number(s) of the test(s) to be run on the circuit design so as to generate a modified second model, wherein the regeneration of the portions of the second model is performed using the second setup information and the version number(s) of the test(s) to be run on the circuit design;

link the modified second model to the circuit design; and perform verification of the circuit design using one of the received second model or the linked modified second model.

17. The non-transitory computer readable medium of claim 16, wherein the instructions further cause the processor to:

regenerate the portions of the first model on a first computer; and regenerate the portions of the second model on a second computer concurrently with the regeneration of the portions of the first model.

18. The non-transitory computer readable medium of claim 16, wherein the instructions further cause the processor to:

store the first setup information; and storing the second setup information.

19. The non-transitory computer readable medium of claim 16, wherein the instructions further cause the processor to:
- store the version number of each of the plurality of tests performed by the first and second versions of the verification tool.

20. The non-transitory computer readable medium of claim 16, wherein the instructions further cause the processor to:
- link the first model to the circuit design in response to a determination that, for each of the plurality of the tests performed by the first version of the verification tool, the version number of the test to be run on the circuit design is compatible with the version number of the test performed by the first version of the verification tool.

* * * * *